United States Patent [19]
Toro

[11] Patent Number: 5,288,223
[45] Date of Patent: Feb. 22, 1994

[54] THREE STAGE INTERMIXING FEED SCREW FOR POLYMERS

[76] Inventor: Alfonso Toro, 60 Linus Allain Ave., Gardner, Mass. 01440

[21] Appl. No.: 80,798

[22] Filed: Jun. 22, 1993

Related U.S. Application Data

[63] Continuation-in-part of Ser. No. 716,663, Jun. 14, 1991, abandoned.

[51] Int. Cl.⁵ .............................................. B29B 7/42
[52] U.S. Cl. ................................ 425/208; 264/349; 366/89; 366/90
[58] Field of Search ............ 425/190, 200, 207, 208; 264/211.21, 211.23, 349; 366/77, 79, 88, 89, 90, 323

[56] References Cited

U.S. PATENT DOCUMENTS

| | | |
|---|---|---|
| 2,556,276 | 6/1951 | Henning . |
| 3,487,503 | 1/1970 | Barr et al. . |
| 3,632,254 | 1/1972 | Woodham . |
| 3,698,541 | 10/1972 | Barr .................................... 425/208 |
| 3,701,512 | 10/1972 | Schippers et al. . |
| 3,989,941 | 11/1976 | Gasior et al. ........................ 259/191 |
| 4,173,417 | 11/1979 | Kruder .................................. 425/208 |
| 4,201,481 | 5/1980 | Iddon et al. . |
| 4,227,870 | 10/1980 | Kim . |
| 4,356,140 | 10/1982 | Kruder .................................. 425/208 |
| 4,712,992 | 12/1987 | Kim . |
| 5,035,509 | 7/1991 | Kruder .................................. 425/208 |
| 5,219,590 | 6/1993 | Kruder et al. ........................ 425/208 |

Primary Examiner—David A. Simmons
Assistant Examiner—William J. Matney, Jr.
Attorney, Agent, or Firm—James A. Hinkle

[57] ABSTRACT

A polymer-extruder screw has a mixing section with relatively deep channels between flight lands at a proximal end, progressively shallower channels with a progressively larger screw core of a central transition section, and finally a metering section having a plurality of at least three pressure channels juxtaposed helically between flight lands having channel interruptions comprised of helical inclines and constant-radii tops in helical progression to a distal end of the extruder screw where the pressure channels end with equal depth at an interface with a metering gate of an extruder. The pressure channels can be symmetrical or asymmetrical in angles of incline and decline at opposite helical sides of the channel interruptions for optimizing channel depths, for positioning of maximum channel depths in relation to tops of channel interruptions, for equalizing channel depths at the distal end of the extruder screw and for optimizing incline and decline advantages for polymers with different characteristics. Helical degrees of channel-interruption cycles can be different for different polymers. The screw core in the mixing section can be graduated in diameter and distance between flight lands can be designed as required for different polymers.

30 Claims, 3 Drawing Sheets

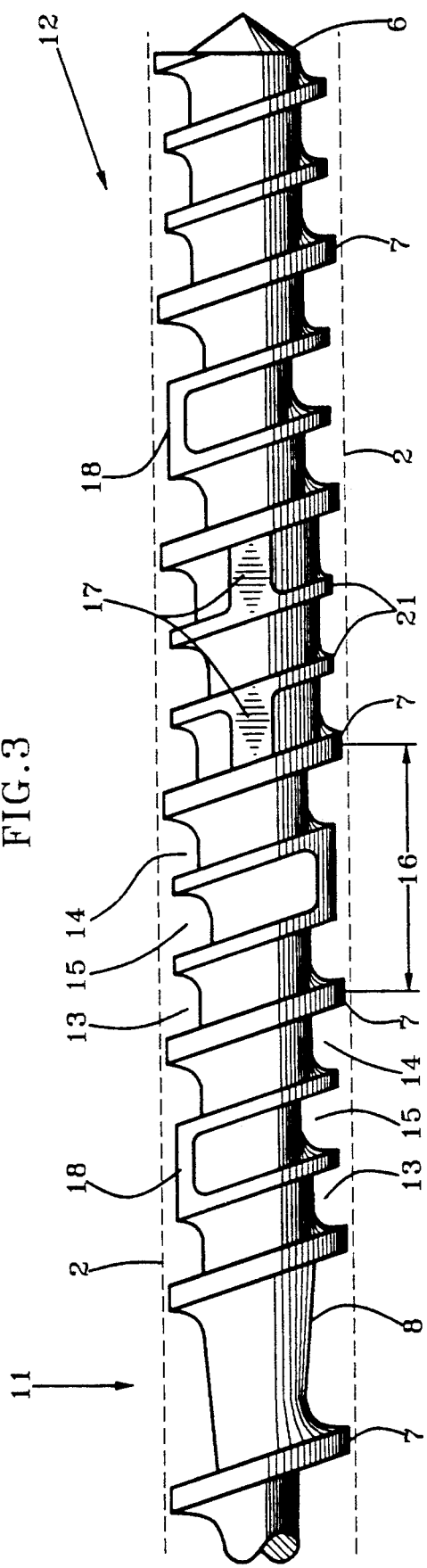
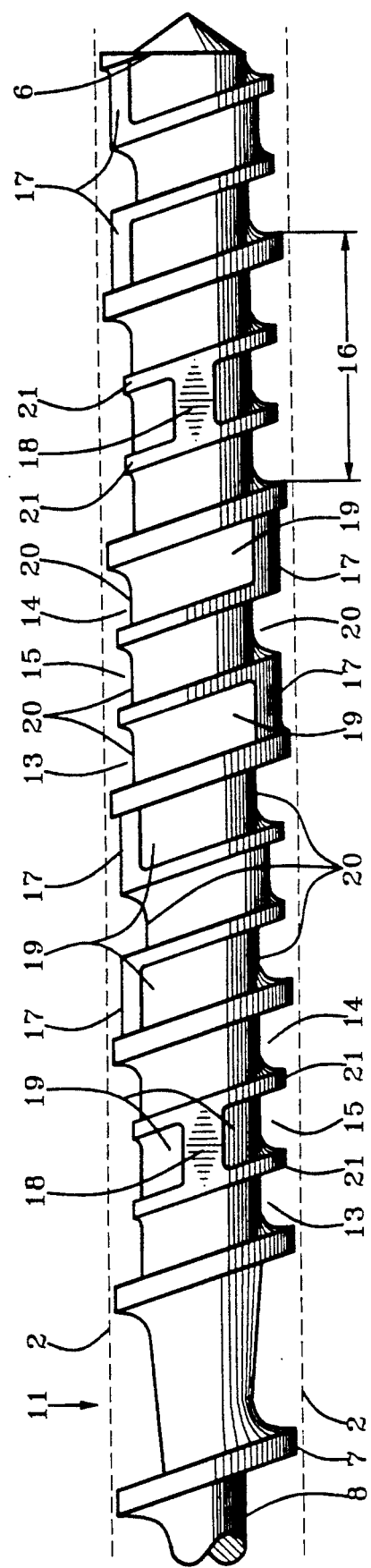
FIG.3
FIG.4

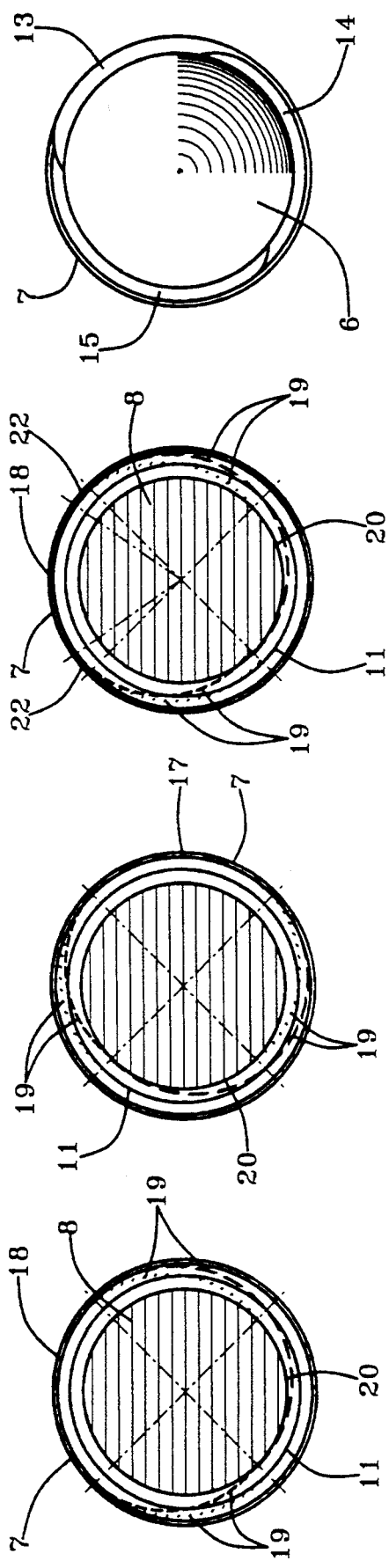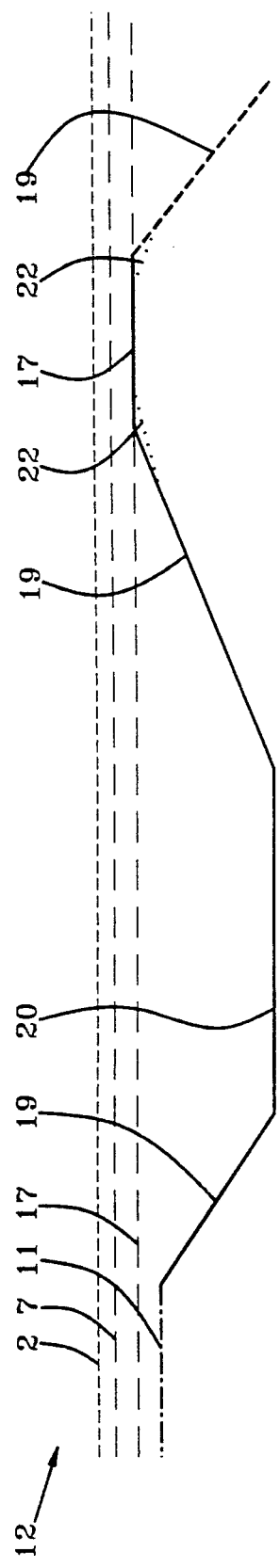

THREE STAGE INTERMIXING FEED SCREW FOR POLYMERS

This is a continuation-in-part of application Ser. No. 07/716,663 filed Jun. 14, 1991 now abandoned and titled "Three Stage Intermixing Feed Screw For Polymers".

BACKGROUND OF THE INVENTION

I. Field of the Invention

The present invention generally relates to the field of polymer-extruder screws for plastic-extrusion machines and in particular to a three-stage-extruder screw.

II. Description of the Prior Art

Plastics are extruded from an extruder bore of a polymer extruder into which polymers in solid pellet and powder forms are fed into a hopper at a proximal end of an extruder bore. In the extruder bore, heat is added and extracted externally as necessary to maintain temperature at an even level while an extruder screw, similar in principle to a meat-grinder screw, mixes, pulverizes, liquefies, pressurizes and conveys the polymer material to a metering gate at a distal end of the extruder bore. It is a three-phase process of (1) mixing, (2) liquefying and (3) metering.

Providing an even flow of plastic in a desired fluid consistency is crucial to efficient and reliable extrusion. Achieving this even flow under dynamic phase-change conditions of the three-phase process has been a major problem in the plastics industry. Improvements are being sought constantly.

Plastic extrusion generally is referred to by originators of some extruder equipment as "plastication". The polymers are said to be "plasticated" by a polymer extruder, although neither of these terms are included in most standard dictionaries. A plastication process differs from plasticization and plasticizing primarily by (1) the use of pulverizing pressure that generates a portion of heat internally for melting the solid pellets, and (2) addition of melt or phase-change heat.

Related improvement steps were described in two U.S. patents, U.S. Pat. Nos. 4,173,417 and 4,356,140 granted to Kruder and U.S. Pat. No. 4,201,481 granted to Iddon et al. The Kruder patents taught a distal-end mixing section of an extruder screw having pairs of two wave channels juxtaposed between helical thread flights of the extruder screw. Wave crests or peaks were offset from wave valleys symmetrically in helical progression.

Crests of the waves did not have constant radii nor near-constant radii in relation to an axis of the extruder screw as one of the features taught by this invention. Instead the Kruder crests were actual peaks having radii which decreased immediately on both helical sides of a maximum height of the crest.

Confirming unawareness of advantages of constant-radii or near-constant-radii crests relative to the axis of the extruder screw, the Kruder patents teach "relatively short" wave cycles. "At least four cycles along the helical length of such channel . . ." is a typical recommendation in the specification and claims of the Kruder patents. Although the option of wave cycles as long as 540 degrees is mentioned in the Kruder technology, there is no reference nor teaching of constant-radii or near-constant-radii crests, regardless of angular duration of wave valleys, whether flat-bottomed or arcuate in helical form.

Further emphasizing crests with radii which change relative to a position separated from the axis of the extruder screw, the second Kruder patent illustrates in its FIG. 6, a wave crest 68 having constant radii in relation to a center of a "protrusion" 62 instead constant radii in relation to a center of the extruder screw 47. Surfaces with changing radii 64 and 66 are shown as having an abruptness that teaches emphatically against graduated inclines of a crest. The inclines 64 and 66, both upstream and downstream helically from the wave crest 68, were circular protrusions, although described contradictorily and incorrectly as inclines. While the second Kruder patent claimed only methods, it was subsequent to the first Kruder patent and demonstrated a tendency not to recognize but to depart further from the channel interruptions and other teachings of this invention.

Although the Kruder description indicated the possibility of different numbers of offset channels side-by-side, its claims limited it to a pair of two. Neither the specifications nor the claims taught the advantages of three with the two outside channels having wave cycles offset from one in the center. To mention a possibility of different pluralities in a description and then to restrict to a particular plurality in claims evidences lack of awareness and, therefore, absence of the teaching of a different plurality, especially when the means for achieving the different plurality require different structure involving constant-radii or near-constant-radii crests as taught by this invention.

The Kruder patents made no mention of equal-depth termination of wave-cycle channels at a distal end of the extruder screw. This is highly advantageous to uniform metering. It is another difference from the Kruder technology.

Although the channels between screw flights in this invention have been referred to previously as channels with "wave-cycle crests and valleys", this is an incorrect and misleading characterization. It is a use of prior-art terms to define new features of the art that require different terms. Instead of wave cycles with crests and valleys in channels, there are channels with "interruptions" by "inclines", "interruption tops" and "core rounds" in helical progression selectively. In some portions of channel interruptions, there is symmetry of incline and decline and in other portions there is not. Also, in some portions of channels, inclines are combined with core rounds to form near-round or near-constant-radii inclines, particularly at top portions of channel interruptions.

Further, yet different, from the Kruder technology, the top portions of channel interruptions have no "secondary flights" between channel crests. Rather, the interruption tops in this invention have no "barrier flights". Barrier flights between channel interruptions are tapered away at channel interruptions to allow passage of materials inwardly towards a center channel or outwardly towards side channels at opposite ends of "interruption cycles". By contrast, the Kruder technology refers to its crests as channels with less depth than at other portions of channels. Its channels continue to be channels having barrier flights as walls in crest sections as in other channel sections of its wave cycles.

The structural differences taught by this invention cause substantial improvement in "plastication" for the following combined reasons. Polymer pellets and powders that have been partially processed in the mixing and transition portions of the extruder screw can be ground, compressed, melted and metered more thoroughly between extruder bores and inclined channel interruptions with this extruder screw than between extruder bores and peaks in shallow channels with the Kruder technology. Less clearance space for more thorough compression and shearing is possible between a channel interruption and an extruder bore than between a channel bottom and an extruder bore. Secondary barrier flights at edges of the channel crests of the Kruder technology prevent effective nearness of crest surfaces to an extruder bore.

Constant-radii channel interruptions taught by this invention provide a fine-grinding effect by selectively long, close relationship to the extruder bore. Near-constant radii of shallow-sloped channel-interruption tops of cycles can be employed to force remaining un-pulverized and un-melted particles more gradually for finer melt results. It is a geared-down rotational grinding effect. Remaining particles are contained over broader surfaces in a smaller clearance space between the channel interruptions and the inside periphery of the extruder bore.

Containment for finer rotational compression is achieved with broader surfaces instead of with secondary barrier-flight walls which necessitate greater space between wave crests and the extruder bore. Particles not trapped and compressed within broader and closer clearance between the interruption tops and the bore are allowed to escape linearly into a center channel or into side channels at alternate cycles for later compression at subsequent interruption tops.

Finally in the metering section, a more thorough, uniform and, consequently, a higher quality of melt without un-melted particles is fed evenly from channels. This is achieved with pressure channels having even depths at a distal end of the extruder screw.

Although employing the principle of an extruder screw as in meat grinders and in the Kruder technology, this is no meat-grinder screw. Nor is it a Kruder screw. Rather, it employs rotational compression much more effectively and for a higher proportion of the work-load of compression than either. A meat-grinder screw has nearly all linear compression which is not effective for plastication of polymer pellets and powders. Linear compression relies on forcing products through restrictions at a distal end of an extruder screw or linearly in reverse between flight tops and a bore in opposition to linear restrictions at the distal end.

By comparison, rotational compression relies on forcing products between a bore and "highs" of crests in the Kruder technology and between a bore and highs of inclines of channel interruptions in this invention. The longer, broader and closer clearances made possible with this invention, together with escape of un-melted particles in either direction for subsequent fine processing, together with other features, combine to provide plastication improvements that are highly significant to the plastics industry.

The Iddon patent taught constant-radii ramps between screw flights. In effect, it employed a plurality of flights having shorter radii between main flights for an extruder screw used in the rubber industry where crushing pellets is not a factor. The flights having smaller radii were bordered by channels extending to a screw core. The radii were constant throughout most of screw length such that there was only minimal if any rotational compression.

SUMMARY OF THE INVENTION

In accordance with the present invention, it is contemplated that in light of the need for improvement in plastication that exists and continues to exist in plastic extrusion, a primarily objective of this invention is to provide an extruder screw which:

Achieves shearing and compression with rotational flow to avoid positioning of particles at a distal end of an extruder bore as has occurred previously for achieving linear resistance to flow between the extruder bore and flight lands of the extruder screw;

Has minimal clearance between an extruder bore and tops of pressure-channel interruptions in pressure channels between screw flights in a metering section of the extruder screw in order to maximize rotational shearing and compression of polymer particles in the plastication process;

Provides even flow through channels having equal depths at a distal end of the extruder screw;

Provides pressure-channel interruption tops with no-incline and, optionally, with low-incline channel interruptions for fine pulverization and compression of polymer particles at terminal ends of the pressure channels;

Provides bi-directional travel of un-pulverized particles from interruption tops to bordering pressure channels for pressurization in subsequent pressurization cycles in helical progression throughout the metering section of the extruder screw; and Provides a variety of design potentials for mixing and transitional sections of extruder screws in relation to the metering section of the extruder screw for polymers having different characteristics and for different sizes of extruders.

This invention accomplishes the above and other objectives with a polymer-extruder screw having a mixing section with relatively deep channels between flight lands at a proximal end, progressively shallower channels with a progressively larger screw core of a central transition section, and finally a metering section having a plurality of at least three pressure channels juxtaposed helically between flight lands having channel interruptions comprised of helical inclines and constant-radii tops in helical progression to a distal end of the extruder screw where the pressure channels end with equal depth at an interface with a metering gate of an extruder. The pressure channels can be symmetrical or asymmetrical in angles of incline and decline at opposite helical sides of the channel interruptions for optimizing channel depths, for positioning of maximum channel depths in relation to tops of channel interruptions, for equalizing channel depths at the distal end of the extruder screw and for optimizing incline and decline advantages for polymers with different characteristics. Helical degrees of channel-interruption cycles can be different for different polymers. The screw core in the mixing section can be graduated in diameter and distance between flight lands can be designed as required for different polymers.

Other objects, advantages and capabilities of the invention will become apparent from the following description taken in conjunction with the accompanying drawings showing preferred embodiments of the invention.

BRIEF DESCRIPTION OF THE DRAWINGS

FIG. 3 is a sectional view of a metering section of the extruder screw;

FIG. 4 is the FIG. 3 illustration rotated ninety degrees;

FIG. 5 is a cross-sectional diagram of a central pressure channel in a metering section of the extruder screw;

FIG. 6 is a cross-sectional diagram of a side pressure channel that is adjacent to and offset in helical progression from the central pressure channel shown in FIG. 5;

FIG. 7 is a cross-sectional diagram of a side pressure channel having interruption tops with constant-radii and ramps with near-constant radii relative to an axis of the extruder screw;

FIG. 8 is an end view of an extruder screw showing pressure channels having equal depth at a distal end; and FIG. 9 is a linear diagram of pressure channels, channel interruptions and a screw core in relation to an extruder bore.

DESCRIPTION OF THE PREFERRED EMBODIMENTS

Figure 1:
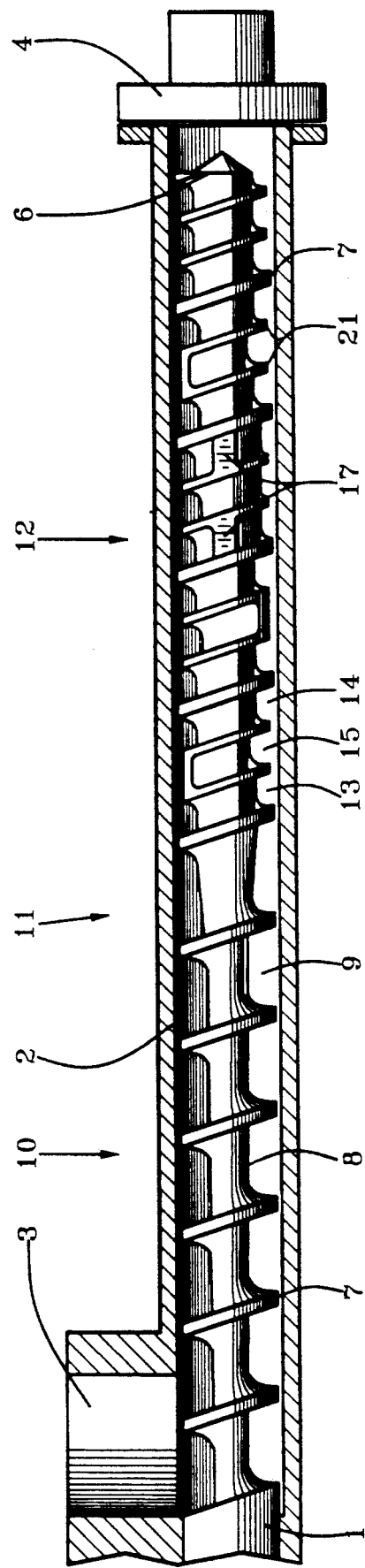
FIG. 1 is a cutaway sectional view of an extruder bore with an extruder screw positioned in relation to a hopper at a proximal end and an extruder gate at a distal end.

Referring to the drawings wherein like reference numerals designate corresponding parts throughout the several figures, reference is made first to FIG. 1. An extruder screw 1 is rotated in an extruder bore 2 into which polymer pellets, powder and other substances are fed into the extruder bore 2 through a hopper 3. The extruder screw 1 is rotated to mix, crush, melt and otherwise process polymer material in various extruder machinery. Processed polymer in liquid form of desired consistency is extruded through a gate 4 at a distal end of the extruder bore 2. This process is referred to in the trade as "plastication".

Figure 2:
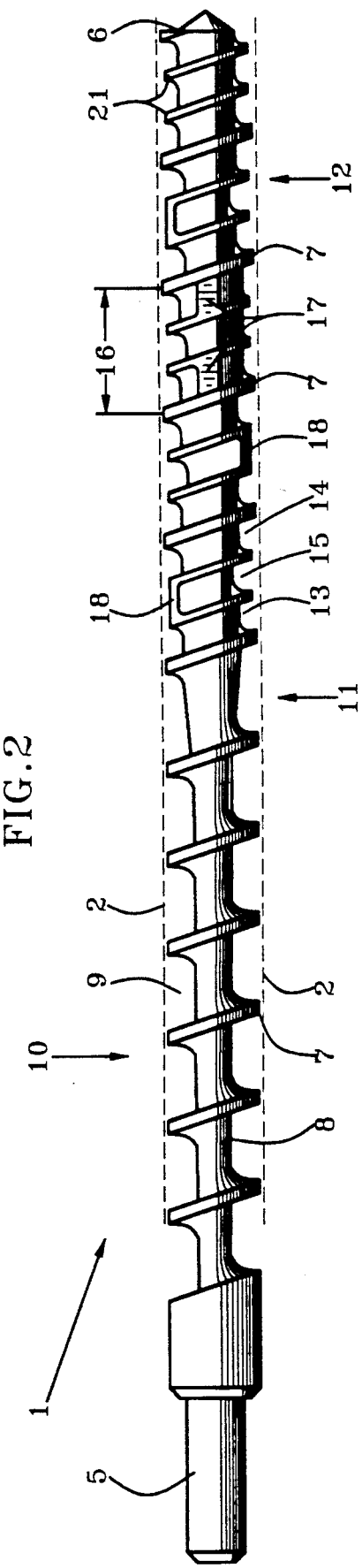
FIG. 2 is a side elevation view of an extruder screw with dashed lines indicating positioning of the extruder bore.

Referring to FIGS. 1 and 2, the extruder screw 1 has a shank 5 at a proximal end and a discharge tip 6 at a distal end. A main flight 7 is a helical ridge extended radially outward from a screw core 8 in helical progression to form a screw channel 9 intermediate the shank 5 and the discharge tip 6.

Depth of the screw channel 9 varies in different sections of the extruder screw 1. Maximum depth of the screw channel 9 is at a mixing section 10 which comprises approximately the first forty percent of a length of the extruder screw 1. Greatest depth of the screw channel 9 at the mixing section 10 is provided to accommodate a desired maximum of polymer pellets and other materials. Depth of the screw channel 9 can be decreased as the polymer pellets are mixed with smaller particles and broken by shearing and compression. Optionally, some of the decrease in depth of the screw channel 9 can commence in the mixing section 10 as shown. Most of the decrease in depth of the screw channel 9, however, is in a transition section 11.

The transition section 11 comprises approximately twenty percent of the length of the extruder screw 1 intermediate the mixing section 10 and a metering section 12. In the transition section 11, diameter of the screw core 8 is increased with a resulting decrease in depth of the screw channel 9. Also, screw-flight distance between helical rotations of the main flight 7 can be increased. Shallowness of the screw channel 9 provides linear pressure for limited linear shearing action and thorough mixing prior to the metering section 12. Increase in distance between helical rotations of the main screw 7 provides a broader surface for high-pressure processing of the polymers in the metering section 12.

Reference is made now to FIGS. 3 and 4 primarily and to FIGS. 1 and 2 secondarily. The metering section 12 has a plurality of at least three pressure channels juxtaposed helically between helical rotations of the screw flights 7. Three pressure channels are a proximal-side pressure channel 13, a distal-side pressure channel 14 and a center pressure channel 15.

Spaces in which the pressure channels 13-15 and other channel components are positioned between helical rotations of the main screw 7 are referred to as screw flights 16. Although the main flight 7 is a continuous helical ridge, the screw flights 16 are linear sections from a point of reference to a nonrotating extruder screw 1. Screw flights 16 correspond to pitch in regular screws.

The pressure channels 13-15 are not continuous. They are interrupted by channel interruptions having side interruption tops 17 and center interruption tops 18 from which helical slopes 19 are extended inward radially on opposite helical sides of the side interruption tops 17 and on opposite sides of the center interruption tops 18 respectively. The helical slopes 19 can have different angles of incline on opposite sides of the interruption tops 17 and 18 and can be designed differently for different types of polymers. Typically, the helical slopes 19 have less incline on pressure sides than on aft sides of the interruption tops 17 and 18. Pressure sides or leading sides of interruption tops 17 and 18 with less incline of helical slopes 19 are the helically distal sides. At positions where helical slopes 19 are ascending from pressure-channel bottoms 20 of side pressure channels 13 and 14, channel bottoms 20 of pressure channel 15 are descending from center interruption tops 18. At a point in their passing of ascent and descent, the depths of pressure channels 13-15 at slopes 19 can be equal as shown in FIG. 4.

The interruption tops 17 and 18 have constancy of radii in relation to an axis of the extruder screw 1 as designed for plasticating desired polymer substances. Constancy of radii of interruption tops 17 and 18 can be constant or near constant. Constant radii results in circular interruption tops or circular portions of interruption tops 17 and 18. Near-constant radii results in near-circular portions of interruption tops 17 and 18. The near-circular portions of interruption tops 17 and 18 are typically at leading or distal sides, although they can be at both sides of the interruption tops 17 and 18.

Pressure-channel bottoms 20 of the side pressure channels 13 and 14 are offset helically as desired from pressure-channel bottoms 20 of the center pressure channel 15. The pressure-channel bottoms 20 can have constant or varied radii from the axis of the extruder screw as desired for plastication of particular types of polymers.

The pressure channels 13-15 provide rotational shearing pressure by directing particles to helical slopes 19 where the particles are then forced between the extruder bore 2 and a decreasing-clearance space in helical progression towards the interruption tops 17 and 18. The pressure channels 13-15 have pressure-channel flights 21 which taper away to evenness with the interruption tops 17 and 18. Thus, the channels 13-15 are terminated or interrupted completely at the interruption tops 17 and 18. This allows bidirectional escape of particles being pressurized and escape of "melt" resulting from pressurization and external heat added in the plastication process.

Crucially important, the absence of pressure-channel flights 21 on interruption tops 17 and 18 allows the interruption tops 17 and 18 to be positioned closer to the extruder bore 2 to achieve finer plastication. The pressure-channel flights 21 contain particle mix within the channels 13-15 as the particle mix is conveyed to and forced between a progressively narrowing space between channel bottoms 20 and the extruder bore 2. Finer or smaller particles remaining are restrained by tapering pressure-channel flights 21 in approach towards the pressure tops 17 and 18. Then as the pressure-channel flights 21 terminate, remaining particles are trapped in the narrow space between the extruder bore 2 and broad surfaces of the interruption tops 17 and 18 without the pressure-channel flights 21.

Unrestricted bidirectional escape of more minute particles than possible with continuing secondary flights of the Kruder technology then aids mix of pressure-induced melt with melt caused by external heat. Heat from melt transfers to the finer particles in the narrow space to accomplish a more uniform consistency of the melt. Absence of the pressure-channel flights 21 at the interruption tops 17 and 18 aids flow of melt and particles in combination to enhance the heat transfer from melt to particles for more effective, uniform and reliable plastication.

Together with narrower compression space and broad compression surfaces, the bidirectional travel of mix multiplies by several times the proportion of rotational in contrast to linear pressurization that is possible with known extruder screws. It avoids travel of particles to a distal end of an extruder screw for linear pressurization that jeopardizes melt quality as with meat-grinder screws, the Iddon rubber-processing screw or the Kruder technology. In contrast, continued channels of the Kruder technology allow relatively large particles to travel to a distal end of the extruder screw and thus decrease plastication completeness that can occur fluidly upstream from an extruder gate 4. Travel of particles to a distal end of the extruder screw 1 causes a far greater portion of pressurization to be linear with less effective plastication than is possible with the much higher proportion of far more complete rotational compression provided by this invention.

Referring to FIG. 5 in combination with FIGS. 1-4, a small difference in constant-radii height of a center interruption channel 18 and diameter of the main flight 7 is provided. Helical slopes 19 are represented by dotted lines ascending from a transition-section 11 depth of screw core 8 to a center interruption top 18. Also represented by dotted lines are helical slopes 19 descending from the interruption top 18 to a channel bottom 20. Represented by a dashed line is helical slope 19 ascending from the channel bottom 20 to the interruption top 18. Length of the interruption top 18 with constant radii is preferably ninety degrees of rotation of the extruder screw 1. Length of ascent from the diameter of the screw core 8 at the transition section 11 and length of descent to the pressure-channel bottom 20 also are preferably ninety degrees from respective proximal and distal ends of the interruption top 18 in helical progression that is represented circumferentially in this diagram.

Referring to FIG. 6, a side interruption top 17 offset ninety degrees has the same relationships although preferably but not necessarily the same dimensions as for the center interruption top 18 shown in FIG. 5.

Referring to FIG. 7, interruption tops 17 and 18, represented by center interruption top 18, can have a section of near-constant-radii top 22 on either or both helical sides. This can be little more than a slight rounding of dihedral angles of slopes 19 with interruption tops 17 and 18. It can be most effective if employed at the distal side to provide a yet smaller distance progressively between the extruder bore 2 and the interruption tops 17 and 18. Alternatively, the helical slope 19 leading onto interruption tops 17 and 18 can be longer with less if any constant-radii pressure-channel bottom 20 and then flattened out in approaches to the interruption tops 17 and 18.

Referring to FIG. 8, the pressure channels 13-15 can have equal depth at a discharge tip 6. This provides an even flow at the extruder gate 4 shown in FIG. 1.

Referring to FIG. 9, linear representation of relationships of the interruption tops 17 and 18, which are represented by extruder top 17, to other portions of the metering section 12 are diagrammed in relation to a dashed line representing inside diameter of the extruder bore 2 across a top of the diagram. A top broken line represents diameter of the screw flights 7 in nearest proximity to the extruder bore 2. A bottom broken line represents constant-radii surfaces of the interruption tops 17 and 18. A horizontal centerline represents a diameter of the transition section 11 from which pressure channels 13-15 commence. Leading from the transition section 11, a helical slope 19 drops with relative abruptness to a pressure-channel bottom 20. The pressure-channel bottom 20 can have constant radii as shown by a straight line before ascending with a helical slope 19 to a side interruption top 17. The side interruption top 17 continues with constant radii to a termination of an interruption cycle before descending in new interruption cycle with a helical slope represented by a heavy dashed line 19.

Preferably for many polymers for which this extruder screw 1 is designed, rotational duration of the first descent of helical slope 19 from a diameter of the transition section 11 is ninety degrees circumferentially. Proportionately, a length of constant-radii pressure-channel bottom 20 is one hundred and eighty degrees circumferentially. An ascent of helical slope 19 is one hundred and eighty degrees and constant length of the interruption top 17 is ninety degrees. In total then, an interruption cycle is five hundred and forty degrees.

The descent 19 for the next cycle also is ninety degrees. But the descent 19 must be slightly steeper to descend from a larger diameter at the interruption top 17 than from the transition section 11 to the same depth at the pressure-channel bottom 20.

There is no requirement for symmetry. Relative uniformity is desirable, however, within requirements for optimizing design for plasticating polymers having different characteristics. Circumferential duration of the constant-radii pressure-channel bottoms 20 is a guide to the amount of variation in design that is compatible for cycles less than five hundred and forty degrees. In other words, cycles can be one hundred and eighty degrees shorter or three hundred and sixty degrees of rotation with application of the same design criteria. Shorter cycles are possible with proportionally shallower channels throughout the system. For some polymers, shorter cycles are possible with the same depth of pressure-channel bottoms 20.

Shown in dotted lines at both ends of the interruption top 17 are near-constant-radii sections of the interruption top 17. These are explained further in relation to FIG. 7. Near-constant-radii sections 22 can have a down-gearing compression effect. But they can be replaced by appropriate flattening of helical slopes 19.

Various modifications may be made of the invention without departing from the scope thereof and it is desired, therefore, that only such limitations shall be placed thereon as are imposed by the prior art and which are set forth in the appended claims.

What is claimed is:

1. A polymer-extruder screw comprising:
   a screw channel bounded by a screw core as a channel bottom and a main flight as channel walls forming screw flights extending radially outward from the screw core in helical progression intermediate a screw shank on a proximal end and a discharge tip on a distal end of an extruder screw,
   a mixing section in which the screw channel has a designed mixing depth in a direction perpendicularly to the screw core and a designed mixing width between helical walls of the main flight for receiving and mixing a desired quantity of material between the screw shank and a transition section of the extruder screw,
   a transition section having progressively shallower screw channels with the screw core having a progressively larger diameter extending helically from the mixing section of the extruder screw,
   a metering section having a plurality of at least three pressure channels juxtaposed helically between helical rotations of the main flight and extending from the transition section to the discharge tip of the extruder screw,
   channel interruptions of the pressure channels,
   the channel interruptions being comprised of helical slopes extending inward radially on opposite helical sides of interruption tops,
   the interruption tops having constancy of radii from an axis of the extruder screw,
   pressure-channel bottoms that are offset helically from the interruption tops as designed for effective plastication of different polymers and other substances,
   pressure-channel flights on edges of the pressure channels which are adjacent to other pressure channels between the screw flights, and
   the pressure-channel flights taper away helically to radii equal to the radii of the interruption tops from positions where the interruption-channel bottoms of the pressure channels approach the interruption tops.

2. A polymer-extruder screw as claimed in claim 1, wherein the helical slopes are adjusted in steepness to position the interruption tops adjacent to desired depths of adjacent pressure channels.

3. A polymer-extruder screw as claimed in claim 1, wherein the constancy of the radii of the interruption tops is complete and uniform for a desired length of constant-radii tops.

4. A polymer-extruder screw as claimed in claim 1, wherein the constancy of the radii of the interruption tops is varied with progressively longer radii in a helical direction as designed for a shallow slope of an interruption top having near-constant radii increasingly for a desired portion of the interruption top on each helical side of a constant-radii top having a desired helical length.

5. A polymer-extruder screw as claimed in claim 1, wherein the helical slopes are adjusted in steepness as designed for effective plastication of particular types of polymers and other substances.

6. A polymer-extruder screw as claimed in claim 5, wherein the channel bottoms of the pressure channels have constancy of radii from the axis of the extruder screw as designed for the particular polymers and other substances.

7. A polymer-extruder screw as claimed in claim 1, wherein interruption cycles in degrees of rotation helically from a position on one interruption top to a corresponding position on another interruption top are designed as desired for effective plastication of particular types of polymers and other substances.

8. A polymer-extruder screw as claimed in claim 7, wherein the interruption cycle in degrees of rotation helically from the position on one interruption top to the corresponding position on another interruption top is five hundred and forty degrees.

9. A polymer-extruder screw as claimed in claim 1, wherein depths of the pressure channels are equal at a distal end of the metering section of the extruder screw.

10. A polymer-extruder screw as claimed in claim 1, wherein the designed mixing depth of the screw channel in the mixing section of the extruder is progressively shallower in a direction from the screw shank to the transition section in designed proportion to progressive shallowness of the screw channels of the transition section of the extruder screw as desired for effective plastication of particular polymers and other substances.

11. A polymer-extruder screw as claimed in claim 1, wherein three pressure channels are juxtaposed with interruption tops of a center pressure channel being offset helically from the interruption tops of side pressure channels successively in helical progression as designed for effective plastication of particular polymers and other substances.

12. A polymer-extruder screw as claimed in claim 11, wherein the interruption tops of a first of the side pressure channels are disposed linearly to the interruption tops of a second of the side pressure channels and the interruption tops of the center pressure channel are disposed midway between the interruption tops of the side pressure channels successively in helical progression.

13. A polymer-extruder screw as claimed in claim 12, wherein the interruption tops of the side pressure channels are offset a designed number of degrees helically from the interruption tops of the center pressure channel relative to a corresponding position on the interruption tops of the side pressure channels and a corresponding position on the interruption tops of the center pressure channel as desired for effective plastication of particular polymers and other substances.

14. A polymer-extruder screw as claimed in claim 13, wherein the interruption tops of the side pressure channels are offset two hundred and seventy degrees from the interruption tops of the center pressure channel relative to a corresponding position on the interruption tops of the side pressure channels and a corresponding position on the interruption tops of the center pressure channel.

15. A polymer-extruder screw as claimed in claim 11, wherein depths of the channel bottoms have constant radii in relation to the axis of the extruder screw throughout designed portions of the channel bottoms between the helical slopes.

16. A polymer-extruder screw comprising:
- a screw channel bounded by a screw core as a channel bottom and a main flight as channel walls forming screw flights extending radially outward from the screw core in helical progression intermediate a screw shank on a proximal end and a discharge tip on a distal end of an extruder screw,
- a mixing section in which the screw channel has a designed mixing depth in a direction perpendicularly to the screw core and a designed mixing width between helical walls of the main flight for receiving and mixing a desired quantity of material between the screw shank and a transition section of the extruder screw,
- a transition section having progressively shallower screw channels with the screw core having a progressively larger diameter extending helically from the mixing section of the extruder screw,
- a metering section having a plurality of at least three pressure channels juxtaposed helically between helical rotations of the main flight and extending from the transition section to the discharge tip of the extruder screw,
- channel interruptions of the pressure channels,
- the channel interruptions being comprised of helical slopes extending inward radially on opposite helical sides of interruption tops,
- the interruption tops having constancy of radii from an axis of the extruder screw,
- pressure-channel bottoms that are offset helically from the interruption tops as designed for effective plastication of different polymers and other substances,
- pressure-channel flights on edges of the pressure channels which are adjacent to other pressure channels between the screw flights,
- the pressure-channel flights taper away helically to radii equal to the radii of the interruption tops from positions where the interruption-channel bottoms of the pressure channels approach the interruption tops,
- the helical slopes are adjusted in steepness to position the interruption tops adjacent to desired depths of adjacent pressure channels, and
- the constancy of the radii of the interruption tops is complete and uniform for a desired length of constant-radii tops.

17. A polymer-extruder screw as claimed in claim 16, wherein the helical slopes are adjusted in steepness as designed for effective plastication of particular types of polymers and other substances.

18. A polymer-extruder screw as claimed in claim 17, wherein the channel bottoms of the pressure channels have constancy of radii from the axis of the extruder screw as designed for the particular polymers and other substances.

19. A polymer-extruder screw as claimed in claim 16, wherein interruption cycles in degrees of rotation helically from a position on one interruption top to a corresponding position on another interruption top are designed as desired for effective plastication of particular types of polymers and other substances.

20. A polymer-extruder screw as claimed in claim 19, wherein the interruption cycle in degrees of rotation helically from the position on one interruption top to the corresponding position on another interruption top is five hundred and forty degrees.

21. A polymer-extruder screw as claimed in claim 16, wherein depths of the pressure channels are equal at a distal end of the metering section of the extruder screw.

22. A polymer-extruder screw as claimed in claim 16, wherein the designed mixing depth of the screw channel in the mixing section of the extruder screw is progressively shallower in a direction from the screw core to the transition section in designed proportion to progressive shallowness of the screw channel of the transition section of the extruder screw as desired for effective plastication of particular polymers and other substances.

23. A polymer-extruder screw comprising:
- a screw channel bounded by a screw core as a channel bottom and a main flight as channel walls forming screw flights extending radially outward from the screw core in helical progression intermediate a screw shank on a proximal end and a discharge tip on a distal end of an extruder screw,
- a mixing section in which the screw channel has a designed mixing depth in a direction perpendicularly to the screw core and a designed mixing width between helical walls of the main flight for receiving and mixing a desired quantity of material between the screw shank and a transition section of the extruder screw,
- a transition section having progressively shallower screw channels with the screw core having a progressively larger diameter extending helically from the mixing section of the extruder screw,
- a metering section having three pressure channels juxtaposed helically between the screw flights and extending from the transition section to a distal end of the extruder screw,
- channel interruptions of the pressure channels,
- the channel interruptions being comprised of helical slopes extending inward radially on opposite helical sides of interruption tops,
- the interruption tops having constancy of radii from an axis of the extruder screw,
- the three pressure channels are juxtaposed with interruption tops of a center pressure channel being offset helically from the interruption tops of side pressure channels successively in helical progression,
- pressure-channel bottoms that are offset helically from the interruption tops as designed for effective plastication of different polymers and other substances,
- pressure-channel flights on edges of the pressure channels which are adjacent to other pressure channels between the screw flights,
- the pressure-channel flights taper away helically to radii equal to the radii of the interruption tops from positions where the interruption-channel bottoms of the pressure channels approach the interruption tops,
- the helical slopes are adjusted in steepness to position the interruption tops adjacent to desired depths of adjacent pressure channels, and the constancy of the radii of the interruption tops is complete and uniform for a desired length of constant-radii tops.

24. A polymer-extruder screw as claimed in claim 23, wherein:
the interruption tops of a first of the side pressure channels are disposed linearly to the interruption tops of a second of the side pressure channels and the interruption tops of the center pressure channel are disposed midway between the interruption tops of the side pressure channels successively in helical progression, and
the interruption tops of the side pressure channels are offset a designed number of degrees helically from the interruption tops of the center pressure channel relative to a corresponding position on the interruption tops of the side pressure channels and a corresponding position on the interruption tops of the center pressure channel as desired for effective plastication of particular polymers and other substances.

25. A polymer-extruder screw as claimed in claim 24, wherein interruption cycles in degrees of rotation helically from a position on one interruption top to a corresponding position on another interruption top are designed as desired for effective plastication of particular types of polymers and other substances.

26. A polymer-extruder screw as claimed in claim 25, wherein the interruption cycle in degrees of rotation helically from the position on one interruption top the corresponding position on another interruption top is five hundred and forty degrees.

27. A polymer-extruder screw as claimed in claim 23, wherein depths of the pressure channels are equal at a distal end of the metering section of the extruder screw.

28. A polymer-extruder screw as claimed in claim 23, wherein the designed mixing depth of the screw channel in the mixing section of the extruder screw is progressively shallower in a direction from the screw core to the transition section in designed proportion to progressive shallowness of the screw channel of the transition section of the extruder screw as desired for effective plastication of particular polymers and other substances.

29. A polymer-extruder screw as claimed in claim 23, wherein the interruption tops of the side pressure channels are offset two hundred and seventy degrees from the interruption tops of the center pressure channel relative to a corresponding position on the interruption tops of the side pressure channels and a corresponding position on the interruption tops of the center pressure channel.

30. A polymer-extruder screw as claimed in claim 23, wherein depths of the pressure channels have constant radii in relation to the axis of the extruder screw throughout designed portions of the channel bottoms between the helical slopes.

* * * * *